United States Patent [19]

Wolters et al.

[11] Patent Number: 4,776,482

[45] Date of Patent: Oct. 11, 1988

[54] STORAGE FILE FOR DISKETTES AND THE LIKE

[75] Inventors: Richard H. Wolters, Grand Rapids Township, Kent County; Arnold J. Hooton, Caledonia Township, Kent County, both of Mich.

[73] Assignee: Westinghouse Electric Corp., Pittsburgh, Pa.

[21] Appl. No.: 8,032

[22] Filed: Jan. 28, 1987

[51] Int. Cl.$^4$ ............................................. B65D 1/24
[52] U.S. Cl. ................................. 220/22.1; 220/22.2; 206/444
[58] Field of Search ...................... 220/22.1, 22, 22.2, 220/22.3, 22.5, 23; 206/45.14, 45.15, 444, 561, 563, 564, 565, 425, 486, 489; 229/120.25, 120.33, 120.34

[56] References Cited

U.S. PATENT DOCUMENTS 4,234,089 11/1980 Morris ................................. 220/22
4,401,222 8/1983 Kulikowski et al. .
4,545,484 10/1985 Rohner ............................... 220/22.2
4,629,067 12/1986 Paulik et al. ........................ 206/444

*Primary Examiner*—Willis Little
*Attorney, Agent, or Firm*—D. R. Lackey

[57] ABSTRACT

A storage file for diskettes and the like which includes a container, first and second side rail members, a cover, and a lock for locking the cover to the container. The storage file is arranged to be supported by a support rail which has a horizontally extending slot. When the storage file is supported by the support rail and locked, the container is simultaneously locked to the support rail by an arrangement which requires the cover to be lifted from its closed position before the container can be removed from the support rail. The storage file may be used to store floppy or rigid diskettes by arrangements which include racks for rigid diskettes which support the diskettes by their lower edges, and dividers for floppy diskettes.

13 Claims, 7 Drawing Sheets

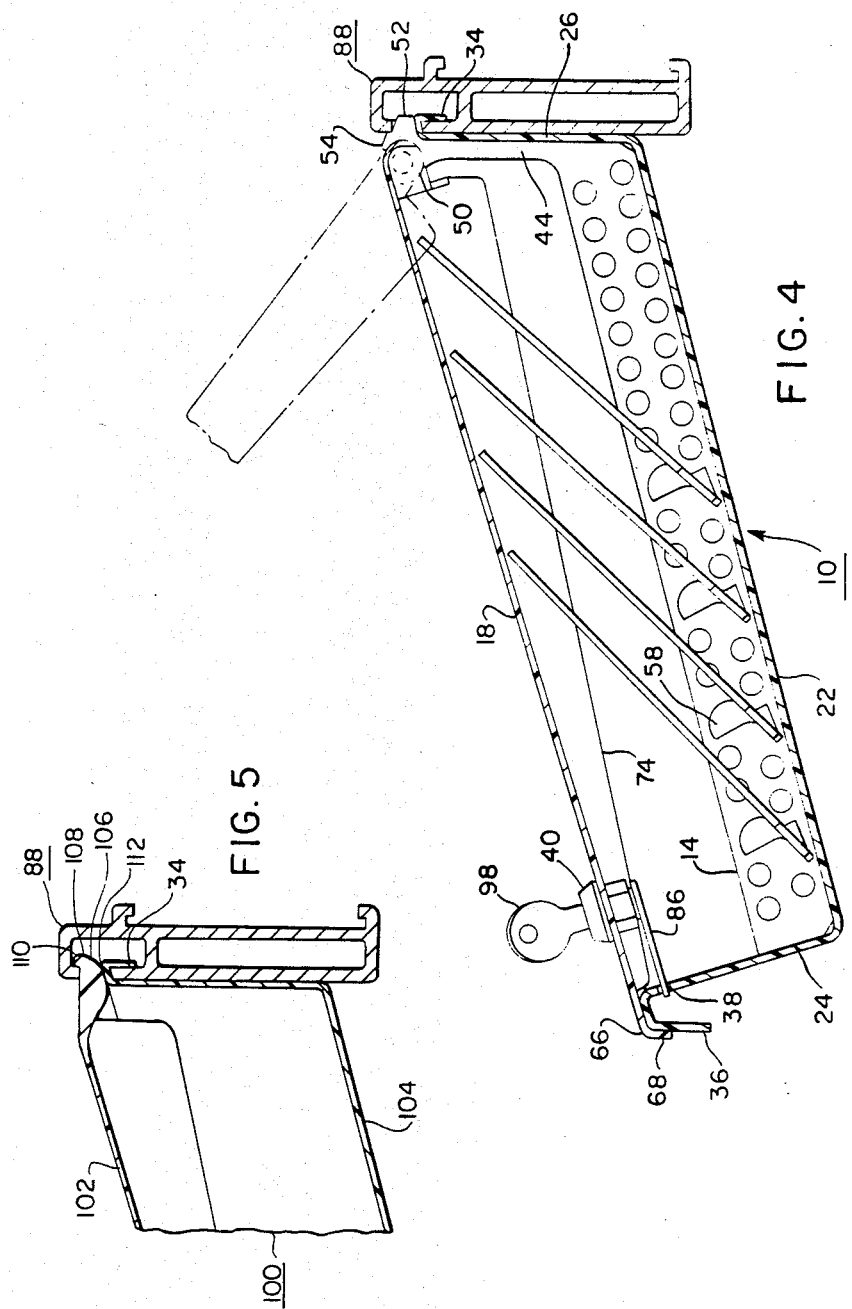

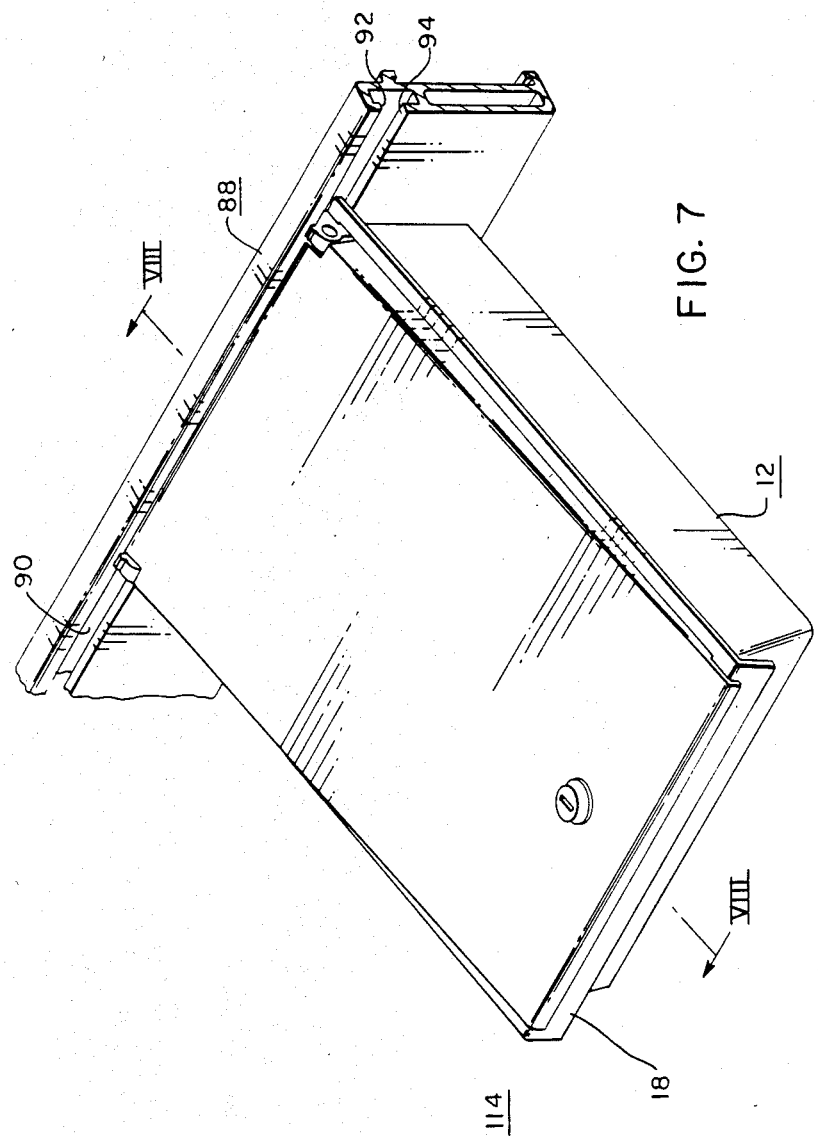

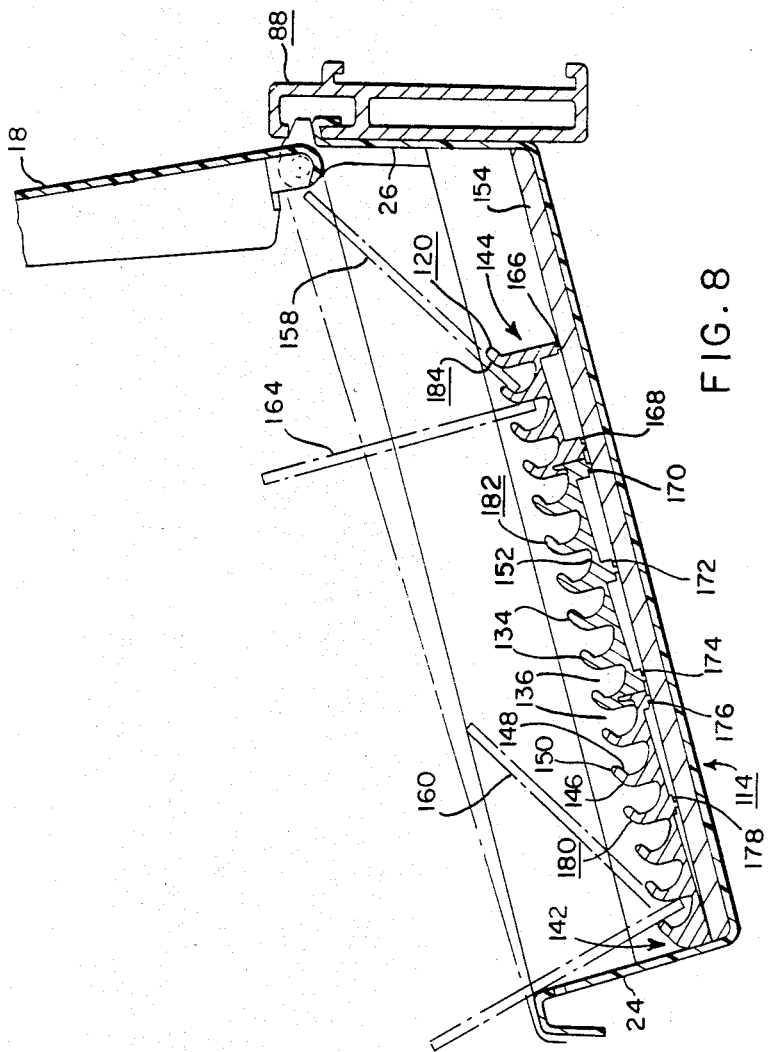

STORAGE FILE FOR DISKETTES AND THE LIKE

BACKGROUND OF THE INVENTION

1. Field of the Invention:

The invention relates in general to storage files, and more specifically to storage files suitable for storing computer diskettes and the like in a position which does not consume primary work surface space, but yet within easy reach.

2. Description of the Prior Art:

With the introduction of containers and trays to store, protect and handle computer media devices, such as floppy diskettes and the smaller, rigid diskettes, there is a need to secure the containers to prevent unauthorized access to the information stored on the media, and /or to prevent the loss of the media devices, It is nearly as important to be able to secure the relatively small containers to the workstation, as it is to secure the contents in the container. Thus, it is an object of the invention to provide new and improved storage files for computer diskettes, and the like, which provide means for protecting the contents of the containers, and means for securing the containers to the workstation.

SUMMARY OF THE INVENTION

Briefly, the present invention is a new and improved storage file for diskettes, which can accommodate either floppy diskettes or the smaller rigid diskettes. In a preferred embodiment of the invention, the new and improved storage file includes an open topped container having a bottom, a front wall, a rear wall and side walls. The back wall has a laterally extending flange at its upper edge which terminates in a depending lip suitable for hanging the container on a support rail having a lip. A pair of side rail members are disposed in the container, with the side rail members each having a rigid portion fixed to a side wall and a flexible portion which rises from the first portion along the back wall and terminates in a barrier knob which overlies the laterally extending flange. A cover for the container is pivotally attached to the second portion of the side rail members. The cover includes lock means for locking the cover to the container when the cover is in the closed position. The barrier knobs and the resiliently flexible second portions of the side rail members to which the cover is attached cooperate with a support rail of the type having a horizontal slot, to prevent the container from being removed from its normally used position on the support rail when the cover is closed. Thus, locking the cover to the container simultaneously locks the container to the support rail. It is important that the arrangement for securing containers to the workstation does not require the containers to be moved from their normal location of use and storage on a support rail. When the cover is unlocked and moved to an open position, the cover may be pulled towards the front of the container to flex the second portions of the side rails and move the barrier knobs to a position which enables the container to be removed from the support rail. The container is also reattached to the support rail by "pulling" the cover to enable the depending lip on the container to "hook" over the lower lip of the horizontal slot in the support rail.

Dividers for floppy diskettes may be removably fastened to the first portions of the side rails; or, special trays having racks constructed according to the teachings of the invention may be placed in the container, which racks are arranged to take advantage of the self supporting characteristic of the smaller rigid diskettes to space the diskettes from one another in a relatively flat storage position, while enabling them to be flipped to an upright identification and retrieval position.

BRIEF DESCRIPTION OF THE DRAWINGS

The invention may be better understood and further advantages and uses thereof more readily apparent when considered in view of the following detailed description of exemplary embodiments, taken with the accompanying drawings, in which:

FIG. 4 is a cross sectional view similar to that of FIG. 3, except illustrating the storage file in its locked configuration which locks the cover of the file to the container portion of the storage file, and the container portion to the support rail;

FIG. 5 is a fragmentary view illustrating how closing the cover of a storage file while on a support rail may lock the container to the rail according to another embodiment of the invention;

FIG. 7 is a perspective view of the storage file shown in FIG. 6, hanging on a storage rail in a user/storage position; and FIG. 8 is a cross sectional view of the storage file shown in FIGS. 6 and 7, illustrating the construction of a rack according the teachings of the invention, as well as storage and retrieval positions of the rigid diskettes which may be stored in the slots defined by the rack.

DESCRIPTION OF PREFERRED EMBODIMENTS

Figure 1:
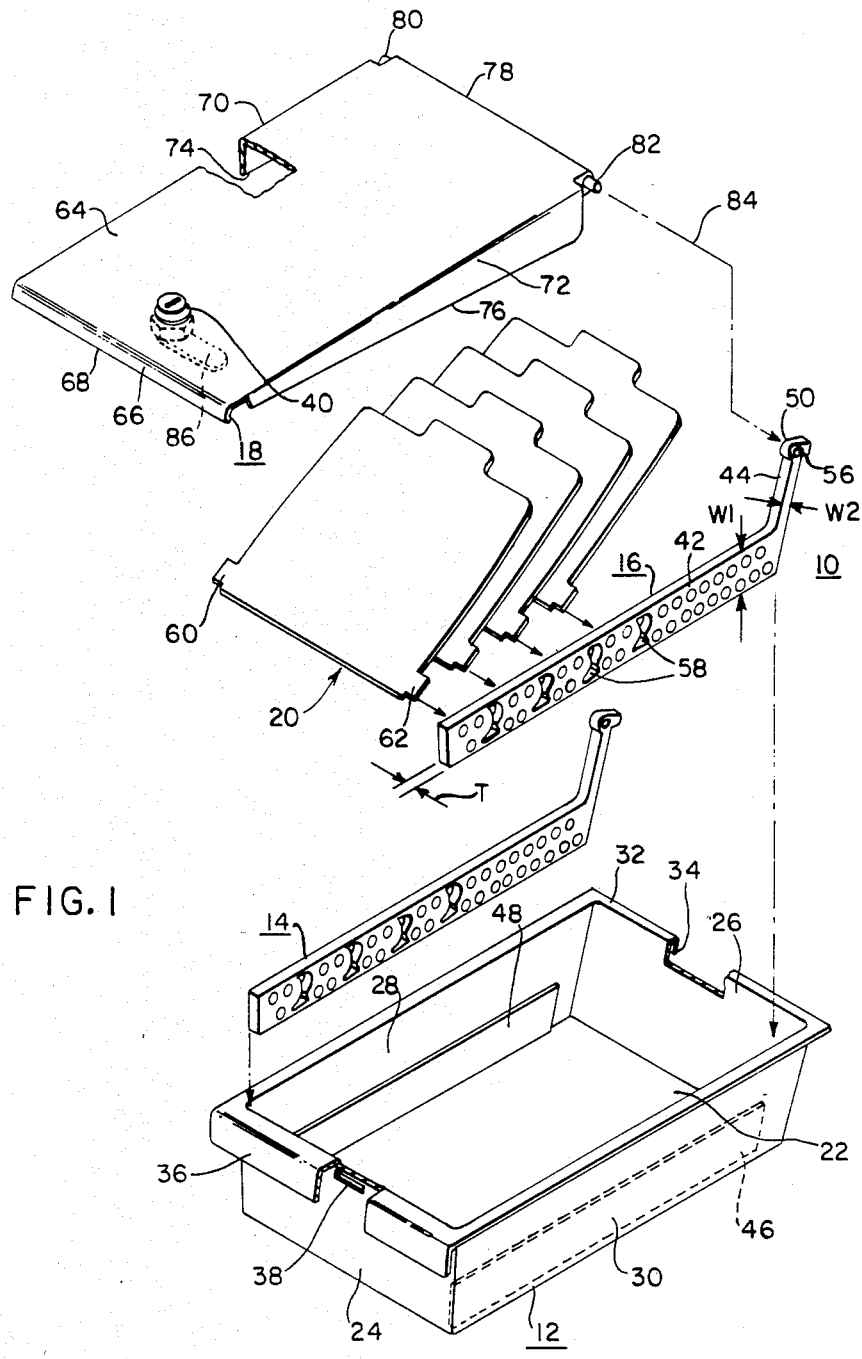
FIG. 1 is an exploded perspective view of a storage file for floppy diskettes, and the like, constructed according to an embodiment of the invention.

Referring now to the drawings, and to FIG. 1 in particular, there is shown a storage file 10 suitable for storing floppy diskettes, and the like, constructed according to an embodiment of the invention. Storage file 10 includes an open topped container 12, first and second side rail members 14 and 16, respectively, a cover 18, and a plurality of dividers 20.

Container 12 includes a bottom 22, a front wall 24, a back wall 26, and first and second side walls 28 and 30, respectively. The back wall 26, which defines an angle of about 105 degrees with respect to the bottom 22, includes a laterally extending flange 32 which terminates in a depending lip 34 suitable for hanging container 12 on a storage rail, as will hereinafter be described. The front wall 24 may also include a laterally extending flange 36 which turns downwardly to provide a convenient location for the user's fingers when handling the container 12, as well as to hide an opening or slot 38 in the front wall 24 which cooperates with a lock 40 on the cover 18.

The first and second side rails 14 and 16 are of like construction, and thus only side rail 16 will be described in detail. Side rail 16 is formed of a high strength plastic which is resiliently flexible in thin sections, and which may be repeatedly flexed without permanent distortion or breakage. For example, side rail 16 may be formed of a polypropylene. Side rail 16 includes first and second integral portions 42 and 44, respectively, which have the same thickness dimension T, but different widths W1 and W2, respectively. The first portion 42 has a relatively wide width W1 selected such that it resists flexing in the direction of the width W1, and the second portion 44 has a relatively narrow width W2 selected such that it may be flexed quite easily, at least such that its extreme end may be moved quite easily for an initial one-half to three-quarters of an inch. Examples of dimensions which have been found to work well are about 7 mm for the thickness T, about 25 mm for the width W1, and about 5 mm for the width W2. The first portion 42 of side rail 16 is disposed in container 12 and fixed to side wall 28 by any suitable means. For example, a double-sided tape may be used, such as tape 46. In like manner, the first side rail 14 may be fixed to side wall 30 via a piece of double-sided tape 48.

The second portion 44 rises upwardly from one end of the first portion 42 at an angle of about 105 degrees relative to the upper edge of the first portion, such that it closely follows the back or rear wall 26. The second portion 44 terminates in an enlarged portion 50, best shown in FIGS. 3 and 4, which is substantially circular except for a barrier knob 52 which extends outwardly from what would be the normal continuation of the circle defined by the enlarged portion 50. The interface between the circle and the barrier knob may also include a slight protrusion 54 which functions as a cover stop at one limit of movement of cover 18. A circular opening 56 is provided through the enlarged portion 50, which opening may be concentric with the circular portion of the enlarged portion 50. A plurality of openings 58 are provided in the first portion 42 of the side rail member 16, and the dividers 20 are held by openings 58 and similar openings in side rail 14. For example, dividers 20 may include mounting tabs 60 and 62, with the dividers 20 being formed of a suitable plastic, such as polypropylene, which permits them to be flexed without damage. One mounting tab is inserted into an opening 58 of a side rail, and the divider 20 is flexed or arched to enable the other mounting tab to be inserted into a like positioned opening in the other side rail. The openings 58 are configured to enable the dividers 20 to be laid back in a storage orientation, and to be pulled forward by the user into a diskette identification and retrieval position.

Cover 18 is preferably formed of a transparent plastic, to enable the contents of the storage file 10 to be observable without lifting the cover. For example, cover 18 may be formed of polycarbonate or acrylic. Cover 18 includes a major flat portion 64 having a front 66 which terminates in a depending lip 68, sides 70 and 72 which terminate in depending flanges 74 and 76, respectively, and a back 78 which includes first and second pivot pins 80 and 82, respectively, disposed on a common pivot axis 84. Pivot pins 80 and 82 are inserted into openings in the side rails 14 and 16, respectively, such as opening 56 in side rail 16, prior to fixing the side rails 14 and 16 in container 12. Of course, the locations of the pivot pins 80 and 82 may be exchanged with the locations of the openings 56, if desired, with the pivot pins on the side rails 14 and 16, and with the openings for the pins in the cover 18. The hereinbefore mentioned lock 40 is fixed in the flat major portion 64 of cover 18, near front 66, such that a key actuated locking tab 86 may be turned to enter slot 38 in the front wall 24 of container 12 when cover 18 is in its closed position, to securely lock cover 18 to container 12 in the locking position of lock 40.

Figure 2:
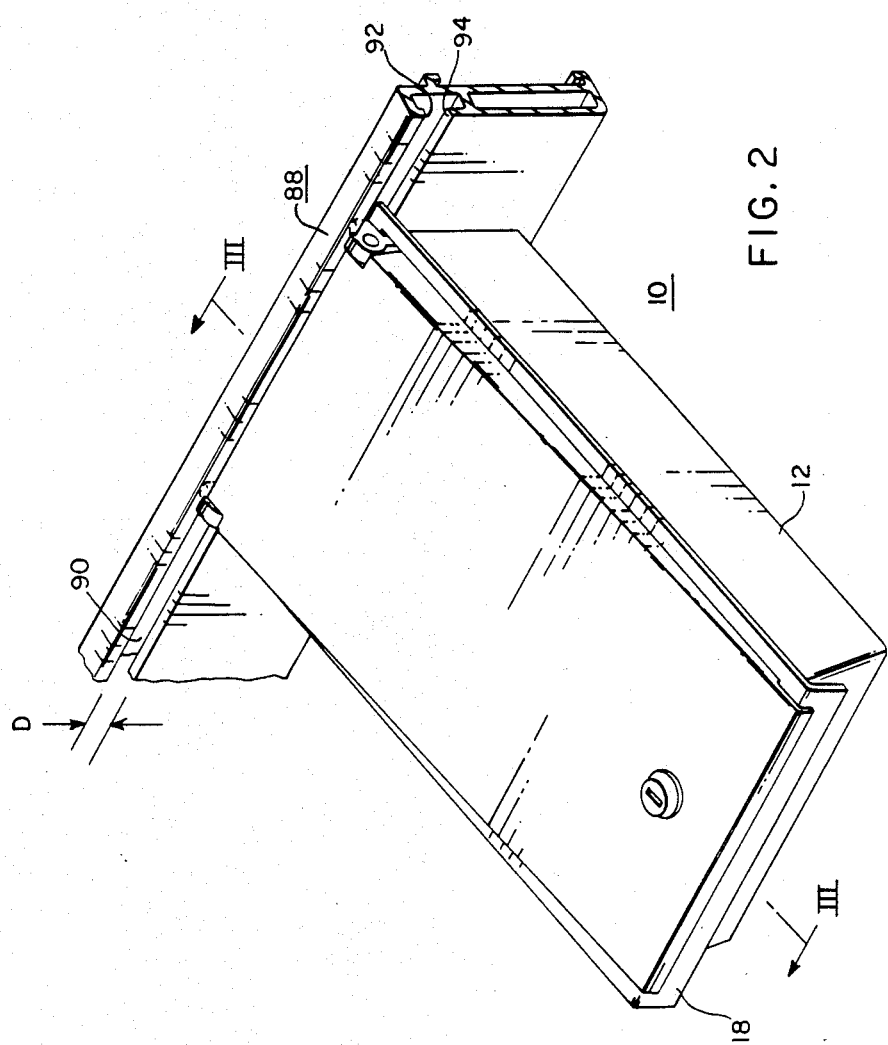
FIG. 2 is a perspective view of the storage file shown in FIG. 1, hanging on a support rail in a user/storage position, which permits a cover on the storage file to be locked which simultaneously locks the file to the support rail.

While storage file 10 has advantages in providing a easy to construct lockable enclosure for floppy diskettes, and the like, in a preferred embodiment of the invention, the storage file 10 is intended to provide a user location, as well as a storage location, on a support rail 88 shown in FIG. 2. FIG. 2 is a perspective view of storage file 10 assembled and supported by support rail 88. A support rail which may be used for rail 88 is disclosed in U.S. Pat. No. 4,401,222, which is assigned to the same assignee as the present application. This patent is hereby incorporated into the present application by reference. In general, the support rail 88, which is shown in cross section in FIG. 3, includes a horizontally extending slot 90 formed by spaced upper and lower lips 92 and 94, respectively, with the lips 92 and 94 being spaced by a predetermined dimension D.

Figure 3:
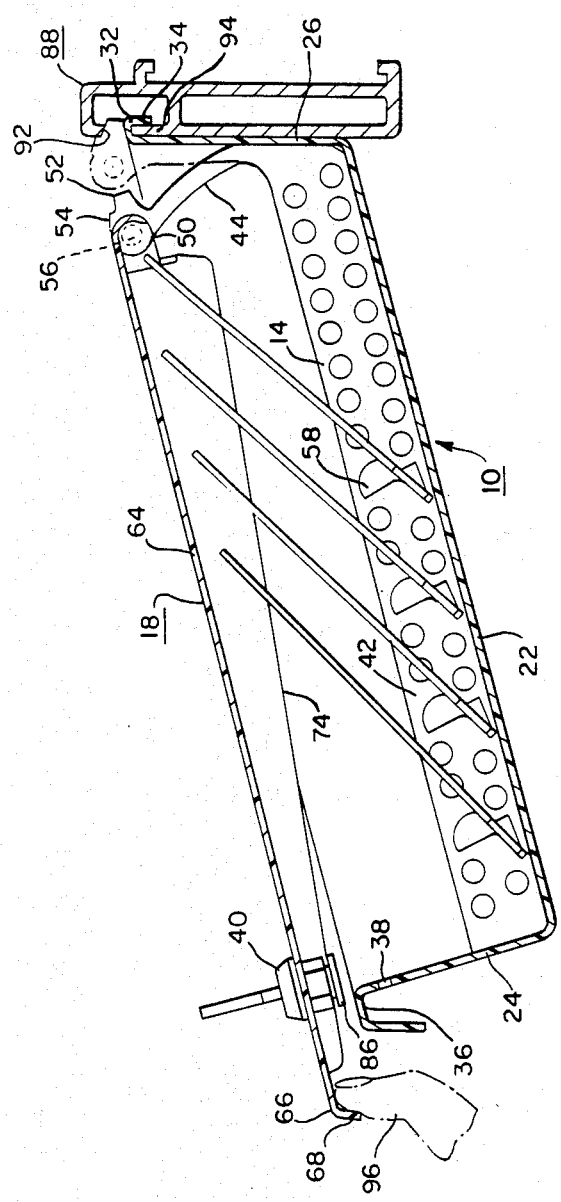
FIG. 3 is a cross sectional view of the storage file shown in FIGS. 1 and 2, taken between and in the direction of arrows III—III in FIG. 2, illustrating how the storage file is placed on, and removed from a storage rail.

FIG. 3, which is a cross sectional view of the assembly shown in FIG. 2 with the dividers 20 removed, taken between and in the direction of arrows III—III in FIG. 2, illustrates how the storage file 10 is attached to, and removed from, support rail 88. Cover 18 is lifted slightly from its fully closed position on container 12 and it is then pulled towards the front of container 12, as indicated by the finger 96 under the depending lip 68 at the front 66 of cover 18. Just enough pulling force is used to flex the second portions 44 of the side rails 14 and 16. The depending lip 34 at the back wall 26 of container 12 may now be hooked over the lower lip 94 of the support rail 88, when placing storage file 10 on the rail 88; or, when the storage file 10 is being removed from support rail 88, the container 12 may be unhooked from lip 94 of the support rail 88. When placing storage file 10 on support rail 88, after the container lip 34 has been hooked over the lower lip 94 of the support rail 88, the pulling force applied to cover 18 is released and the flexible portion 44 returns to its unstressed position, shown in phantom in FIG. 3, with the barrier knob 52 being sized to enter the vertical dimension D defined by the horizontal slot 90 in the support rail 88. The cover 18 may now pivot freely on pivot pins 80 and 82, as shown in the phantom position of cover in FIG. 4, as the storage file 10 is accessed by users.

FIG. 4 is a cross sectional view, similar to FIG. 3, except illustrating how the step of locking the cover 18 to the container 12 simultaneously locks the container 12 to the support rail 88. The cover 18 is pivoted to its closed position, a key 98 is inserted into lock 40 and turned to cause the locking tab 86 to enter slot 38 in the front wall 24 of the container 12. The cover 18 is now locked to the container 12, preventing the contents from being removed. This action also prevents the cover 18 from being used to move the barrier knobs 52 out of the rail slot 90, and thus the container 12 cannot be removed from the support rail 88.

While the preferred embodiment of the invention pivots the cover 18 on the side rails 14 and 16, enabling the storage file to be used on and off the support rail, the invention broadly covers the concept of simultaneously;

(a) locking a storage file cover to a container, and (b) locking the container to a support rail. This concept would also cover an embodiment in which the cover pivots in cooperation with the support rail 88. For example, as shown in the fragmentary view of a storage file 100 in FIG. 5, a cover 102 for a container 104 may have a cam 106 along its back edge 108. The cam 106 is shaped to allow the cam 106, including a protrusion or extension 110 thereof, to be inserted into slot 90 of the support rail 88 when the cover 102 is held in a substantially vertical position. In cover positions closer to the closed position than said substantially vertical orientation, a curved portion of the cam 106 rotates on a flange 112 of container 104 while the extension 110 on cam 106 prevents the cover 102 from being dislodged. Locking the cover 102 to the container 104 also locks the storage file 100 to the support rail 88.

Figure 6:
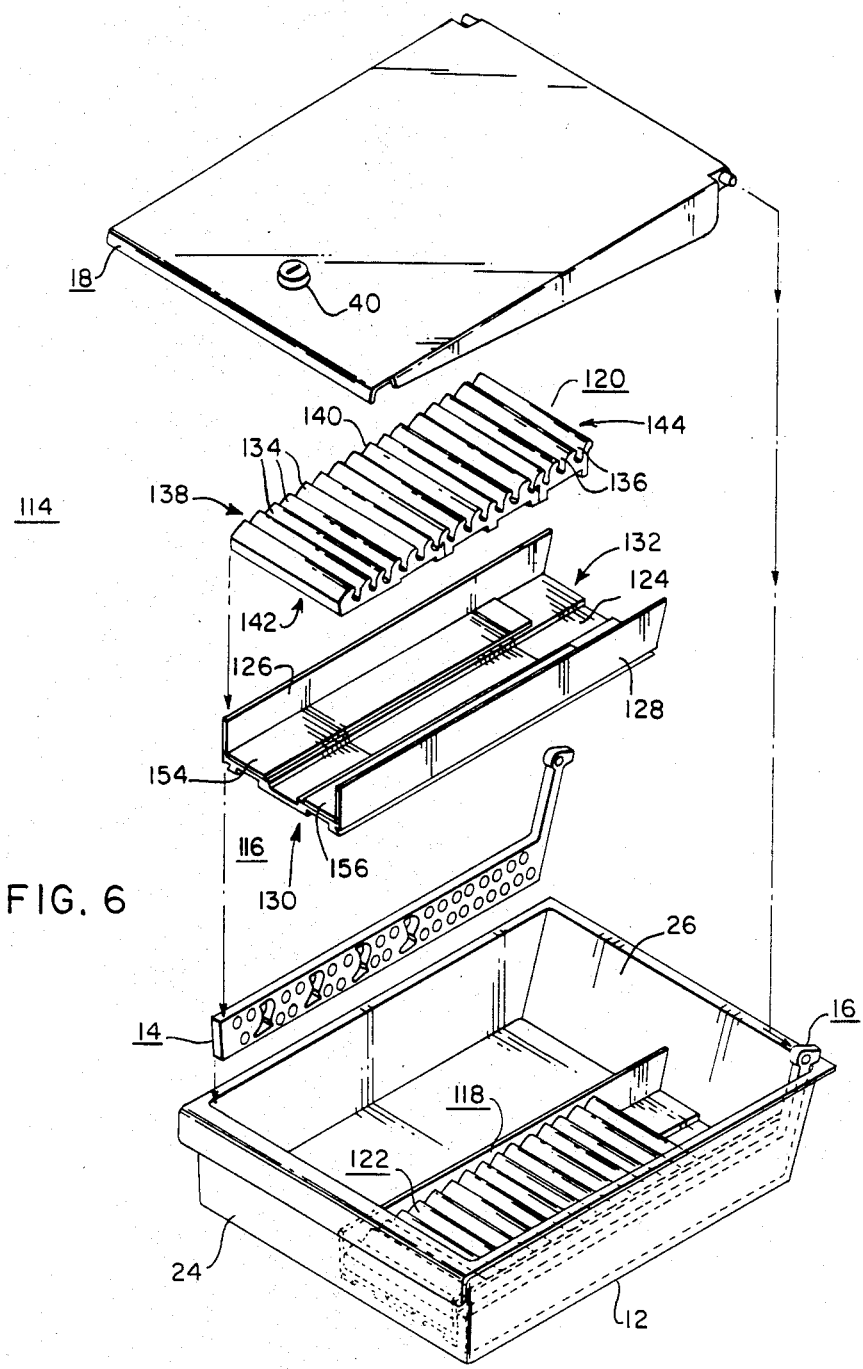
FIG. 6 is an exploded perspective view of a storage file for rigid diskettes constructed according to the teachings of the invention.

FIG. 6 is an exploded perspective view of a storage file 114 constructed according to another embodiment of the invention. FIG. 7 is a perspective view of storage file 114 mounted on the support rail 88, and FIG. 8 is a cross sectional view of the storage file 114 taken between and in the direction of arrows VIII—VIII in FIG. 7. Components of storage file 114 which may be the same as the storage file 10 shown in FIGS. 1 through 4 are given the same reference numerals and will not be described again.

More specifically, storage file 114 includes a container 12, first and second side rails 14 and 16, respectively, a cover 18, and one or more trays having racks therein for storing rigid diskettes, such as trays 116 and 118 having racks 120 and 122, respectively. Since the tray and rack combinations are the same, only tray 116 and rack 120 will be described in detail. Tray 116 includes a bottom 124, first and second upstanding sides 126 and 128, respectively, a front end 130, and a back or rear end 132.

Rack 120 includes a plurality of spaced upstanding elongated finger members 134 which define slots 136 which extend between first and second sides 138 and 140 of the rack 120. The slots 136 are disposed in spaced parallel relation from front 142 to rear 144 of rack 120. Each finger member 134 has first and second sides or surfaces 146 and 148, respectively, which intersect to define an end 150 of the associated finger member. The second side 148 of one finger member 134 intersects the first side 146 of an adjacent finger member to define the base 152 of a slot 136. As best shown in the cross sectional view of FIG. 8, the first side 146 of each finger member 134 has a convex curve which starts at the base 152 of a slot 136 and curves upwardly and backwardly towards the rear end 144 of the rack 120. The second side 148 of each finger member 134 is a convex curve which starts at the base 152 of a slot 136 and curves upwardly and forwardly towards the front end 142 of the rack 120. Rack 120 is fixed in tray 116 by any suitable means, such as by double sided tapes 154 and 156, which are fastened to the bottom 124 of tray 116 adjacent to the first and second upstanding sides 126 and 128.

Rack 120 supports rigid diskettes by their lower edges in first and second selectable orientations in each slot 136. A first orientation is illustrated by rigid diskettes 158, and 160 in FIG. 8. In the first orientation, which is a storage orientation, the diskettes are laid back in a spaced or staggered relation, such as about 10 to 12 mm apart. The spacing is adequate to provide visual identification for each diskette by exposing the top of the identification label. Each diskette is held by the second or concave surface 148 of one finger 134 and by the first or convex surface 146 of the next adjacent finger 134 in the direction towards the rear end 144 of the rack 120. The angle from the plane of a diskette in the storage orientation to the tray bottom 124 is about 40 to 45 degrees. When the tray 116 is disposed in container 12 and container 12 is supported from rail 88 at an angle of about 15 degrees below horizontal, the storage angle of a diskette is about 55 to 60 degrees from the horizontal, which is even better for visual identification.

The configuration of rack 120 allows the diskettes to be manually flipped forward about 70 degrees from the storage orientation, to a second or retrieval orientation illustrated by diskette 164. This second orientation provides for complete identification of the label while allowing easy removal and replacement of a diskette. In the second orientation, a diskette is held by the end 150 of a finger 134 and by the base 152 of the slot 136 which is immediately behind the finger, towards the rear end 144 of the rack 120.

As illustrated in FIG. 8, the cover 18 in the closed position shown in phantom is spaced from the upper edges of container 12 by a larger dimension at the back wall 26 than at the front wall 24. In a preferred embodiment of the invention, the rack 120 takes advantage of the sloping cover 18 to display the diskettes higher in the back of the rack 120 than in the front of the rack for even better visual identification. Rack 120 is supported by a plurality of legs which have a declining dimension from the rear of the rack to the front of the rack, including a leg 166 at the rear 144 of rack 120 which has the greatest dimension, and legs 168, 170, 172, 174, 176, and 178 of progressively smaller dimensions from the back 144 to the front 142 of the rack 120, with the extreme front 142 of the rack having no leg. As illustrated in FIG. 8, the rack 120 may be formed of a plurality of extruded sections which snap together, with three sections 180, 182 and 184 being illustrated for purposes of example.

The tray 116 prevents the diskettes from sliding free from the rack 120, as well as providing means for more readily grasping and handling the assembly, either loaded or unloaded. Two tray/rack assemblies conveniently fit side-by-side in a container 12 having a width dimension of about 21.6 cm. The container 12 displays the diskettes from a support rail 88 at a computer work station without requiring prime work surface, but yet at an ergonomic position. When supported by rail 88, the cover of container 12 may be locked, and the container 12 may be locked to the support rail 88, as hereinbefore described relative to storage file 10. The container 12 may also fit in shallow drawers, cabinets, or even stand on work surfaces, as desired. The tray/rack combination may also be snapped on to a wire hanger, to allow it to hang individually on the support rail 88.

We claim as our invention:

1. A storage file for diskettes and the like, comprising:
   an open topped container having a bottom, a front, a back, and first and second side walls, all having an upper edge,
   first and second side rail members,
   said first and second side rail members having first portions disposed in said container adjacent to the first and second side walls, respectively, and second portions which rise upwardly from the first portions along the back of said container, means fixing the first portions of said first and second side rail members to said container, a cover for said container, and pivot means for pivotally attaching said cover to the second portions of said first and second side rail members, to enable said cover to be pivoted between open and closed positions.

2. The storage file of claim 1 wherein the upper edge of the back of the container includes an outwardly extending flange having a depending lip suitable for hanging the container on a support rail.

3. The storage file of claim 1 wherein the upper edge of the back of the container includes an outwardly extending flange having a depending lip, and the second portions of the first and second rail members include interference portions which extend over said outwardly extending flange in the unstressed positions of said first and second side rail members, and wherein the second portions of the first and second side rail members are resiliently flexible, enabling said interference portions to be moved away from said unstressed positions over said outwardly extending flange, to permit the depending lip to be placed on, and removed from, a support rail having a horizontal slot opening.

4. The storage file of claim 1 wherein:

the upper edge of the back of the container includes an outwardly extending flange having a depending lip, the second portions of the first and second side rail members include interference knobs which extend over said outwardly extending flange in the normal positions of said first and second side rail members, and the second portions of the first and second side rail members are resiliently flexible, enabling said interference knobs to be moved from said normal positions over said outwardly extending flange by pulling the cover when the cover is not in its closed position.

5. The storage file of claim 4 including lock means for locking the cover to the container when the cover is in its closed position, said lock means providing the dual functions of:

(a) preventing access to the container, and (b) preventing the cover to be used to flex the second portions of the first and second rail members, whereby the container may be locked to a support rail having a horizontal slot opening.

6. The storage file of claim 1 including a plurality of dividers in the container held in spaced relation by the first and second side rail members.

7. The storage file of claim 1 including:

a tray in the container, said tray having a bottom, first and second sides, and front and rear ends, a rack in said tray, said rack having a plurality of spaced upstanding elongated finger members which define slots which extend between the first and second sides of said tray, each of said upstanding finger members having first and second sides which face the front and rear ends, respectively, of said tray, said first and second sides of each finger member intersecting to define an end of the finger member, said second side of one finger member intersecting with the first side of an adjacent finger member to define a base of the associated slot, said upstanding finger members being suitable for supporting a rigid computer diskette in first and second selectable orientations in each slot, said first orientation supporting a rigid diskette in a storage position which permits the cover to be closed without interference, and said second orientation being a retrieval position achievable only when the cover is open.

8. The storage file of claim 7 wherein the first and second sides of each upstanding finger member define convex and concave surfaces, respectively, and wherein the first orientation supports a rigid diskette between the concave surface of one finger member and the convex surface of an adjacent finger member, and the second orientation supports a rigid diskette between the base of the associated slot and the end of an adjacent finger member.

9. The storage file of claim 7 wherein the distance from the bottom of the tray to the ends of the finger members increase from the front end of the tray towards the rear end of the tray.

10. The storage file of claim 7 including means fixing the rack in the tray

11. A storage file and support arrangement therefor, comprising:

a support rail having upper and lower vertically spaced lips which define a rail slot, an open topped container having a lip which hangs on the lower lip of said support rail, a cover on said container having open and closed positions, and means for preventing said container from being removed from said support rail when said cover is closed.

12. The storage file and support arrangement of claim 11 including means for locking the cover to the container when the cover is in the closed position, which simultaneously locks the container to the support rail.

13. A method of simultaneously locking: (a) a cover to an open topped container having a back wall, a front wall, and first and second side walls, and (b) the container to a support rail having upper and lower vertically spaced lips which define a rail slot having a predetermined dimension between the lips, comprising the steps of:

providing a laterally extending flange at the upper edge of the back wall of the container, providing a depending lip on the laterally extending flange, providing first and second side rails in the container having rigid first portions fixed to the container and flexible second portions which rise along the back wall and terminate in barrier knobs which extend over the laterally extending flange, attaching a cover to the second portions of the first and second side rails, pulling the cover towards the front wall of the container to flex the second portions of the first and second rails to move the barrier knobs back from the laterally extending flange, hooking the depending lip over the lower lip of the rail during the pulling step, releasing the cover to allow the barrier knobs to extend at least partially into the rail slot, and locking the cover to the container to preclude the pulling step, to lock the container to the rail while the cover is locked to the container.

* * * * *

UNITED STATES PATENT AND TRADEMARK OFFICE
CERTIFICATE OF CORRECTION

PATENT NO. : 4,776,482

DATED : October 11, 1988

INVENTOR(S) : Richard H. Wolters, et al.

It is certified that error appears in the above-identified patent and that said Letters Patent is hereby corrected as shown below:

On the front data page, Item (75) "Inventors" should read as follows:

-- Richard H. Wolters, Grand Rapids Township, Kent County --

Signed and Sealed this

Twenty-eighth Day of March, 1989

Attest:

DONALD J. QUIGG

*Attesting Officer*  *Commissioner of Patents and Trademarks*